United States Patent [19]

Price, Jr. et al.

[11] Patent Number: 5,072,835
[45] Date of Patent: Dec. 17, 1991

[54] TAPE CARTRIDGE HOLDER

[75] Inventors: Macy J. Price, Jr., Louisville; Laurence G. Ball, Denver; Mack E. Johnson, Arvada, all of Colo.

[73] Assignee: Engineered Data Products, Inc., Broomfield, Colo.

[21] Appl. No.: 536,729

[22] Filed: Jun. 12, 1990

[51] Int. Cl.⁵ .............................................. A47G 29/00
[52] U.S. Cl. ...................................... 211/40; 211/41; 211/184; 206/387
[58] Field of Search ..................... 211/40, 41, 184, 43; 206/387

[56] References Cited

U.S. PATENT DOCUMENTS

| | | |
|---|---|---|
| 2,884,139 | 4/1959 | Dunham . |
| 3,002,632 | 10/1961 | George ............................ 211/184 |
| 3,308,964 | 3/1967 | Pistone . |
| 3,780,876 | 12/1973 | Elkins . |
| 3,921,811 | 11/1975 | Dameron . |
| 4,327,838 | 5/1982 | Cooke . |
| 4,395,955 | 8/1983 | Pfeifer . |
| 4,630,737 | 12/1986 | King . |
| 4,651,882 | 3/1987 | Wright et al. . |
| 4,668,027 | 5/1987 | King et al. . |
| 4,792,051 | 12/1988 | Miller ................................. 211/184 |

Primary Examiner—Blair M. Johnson
Attorney, Agent, or Firm—Joseph J. Kelly

[57] ABSTRACT

A compartment forming member for supporting an article such as a tape cartridge on an elongated shelf having a support surface and depending flange portions wherein the compartment forming member has a base portion having a width slightly greater than the width of the support surface and depending flanges and mounting means for mounting the compartment forming member on the support surface including integral spaced apart support members depending from the base portion for supporting the base portion so that it is inclined to and spaced from the support surface and with the flange portions and flanges being in a resilient contacting relationship.

20 Claims, 2 Drawing Sheets

TAPE CARTRIDGE HOLDER

FIELD OF THE INVENTION

This invention relates generally to a holder for tape cartridges for storage and retrieval and more particularly to a holder for one tape cartridge which may be used with other holders on a shelf to provide for the storage and retrieval of a plurality of tape cartridges.

BACKGROUND OF THE INVENTION

There are many types of holders for tape cartridges some of which are designed to hold a plurality of tape cartridges and others are designed to hold a single tape cartridge. In U.S. Pat. No. 4,668,027, there is illustrated a cell for a single tape cartridge that is pivotally mounted on a shelf means. The cell is normally inclined relative to the horizontal so that the rear portion is lower than the front portion. When it is desired to remove a tape cartridge, a cell is pivoted so that the front portion moves downwardly and the tape cartridge is removed. The structure and function of the cells in the '027 patent was superseded by the structure and function of the cells in U.S. Pat. No. 4,651,882. In the '882 patent, the cells are pivotally mounted and are normally inclined relative to the horizontal so that the front portion is lower than the back portion. When it is desired to remove a tape cartridge, the cells on either side of the cell holding the desired tape cartridge are pivoted to move the front portion upwardly while holding the center cell to expose the tape cartridge. From these disclosures, it is clear that there existed a more desirable apparatus for the storage and retrieval of tape cartridges using holders designed to accommodate only one tape cartridge.

BRIEF DESCRIPTION OF THE INVENTION

This invention provides apparatus for forming a compartment to hold a tape cartridge and comprises a compartment forming member which may be snapped into position on a fixed shelf so that a tape cartridge may be stored thereon and retrieved when desired. A plurality of the holders may be positioned in a side-by-side relationship on the shelf.

In a preferred embodiment of the invention, a storage rack, preferably formed from sheet steel, is provided and has a plurality of vertically spaced apart, elongated shelves. Each elongated shelf has a longitudinal axis and a generally horizontal support surface having a length and a width with a pair of longitudinally extending flange portions depending therefrom. A compartment forming member, preferably integrally molded using a relatively rigid plastic material, such as high impact polystyrene, is provided and has a base portion having a supporting surface thereon. The base portion has a width slightly greater than the width of the horizontal support surface and has a pair of spaced apart, integral flanges depending therefrom. An integral rear wall extends upwardly from the base portion and at least one sidewall, integral with the rear wall and the base portion, extends upwardly from the base portion. Integral support means depend from the base portion and are located between the pair of flanges and are in contact with the horizontal support surface of the elongated shelf to support the compartment forming member on the elongated shelf with the flange portions and flanges in a juxtaposed relationship. The integral support means preferably comprises two support members extending from the base portion at differing distances so that the supporting surface of the base portion is inclined relative to and spaced from the horizontal support surface of the elongated shelf. The flange portions have outer surfaces each of which is in contact with at least portion of the inner surfaces of the flanges. The distance between the inner surfaces is slightly more than the distance between the outer surfaces so that at least a small space may be formed between the flange portions and the flanges when the flange portions and flanges are in the juxtaposed relationship. At least one of the flanges has a inwardly directed projecting ledge having a recess formed therein to accommodate an exposed end portion of one of the flange portions to cooperate in releasably retaining the compartment forming member on the elongated shelf. Each of the flange portions has an exposed end portion and each of the flanges has an abutment means projecting inwardly therefrom which are located so that the abutment means are in resilient engagement with the exposed end portions. Each compartment forming member is provided with longitudinally extending recesses and projections so that, when a plurality of them are in a side-by-side relationship, the projections will be located in the recesses. The elongated shelf and the compartment forming member may be made in different sizes to support tape cartridges or other articles of different sizes. Also, a compartment forming member having opposite facing sidewalls may be provided to cooperate with a compartment forming member to provide two compartments each having two sidewalls.

BRIEF DESCRIPTION OF THE DRAWINGS

An illustrative and presently preferred embodiment of the invention is shown in the accompanying drawings in which.

DETAILED DESCRIPTION OF THE INVENTION

Figure 1:
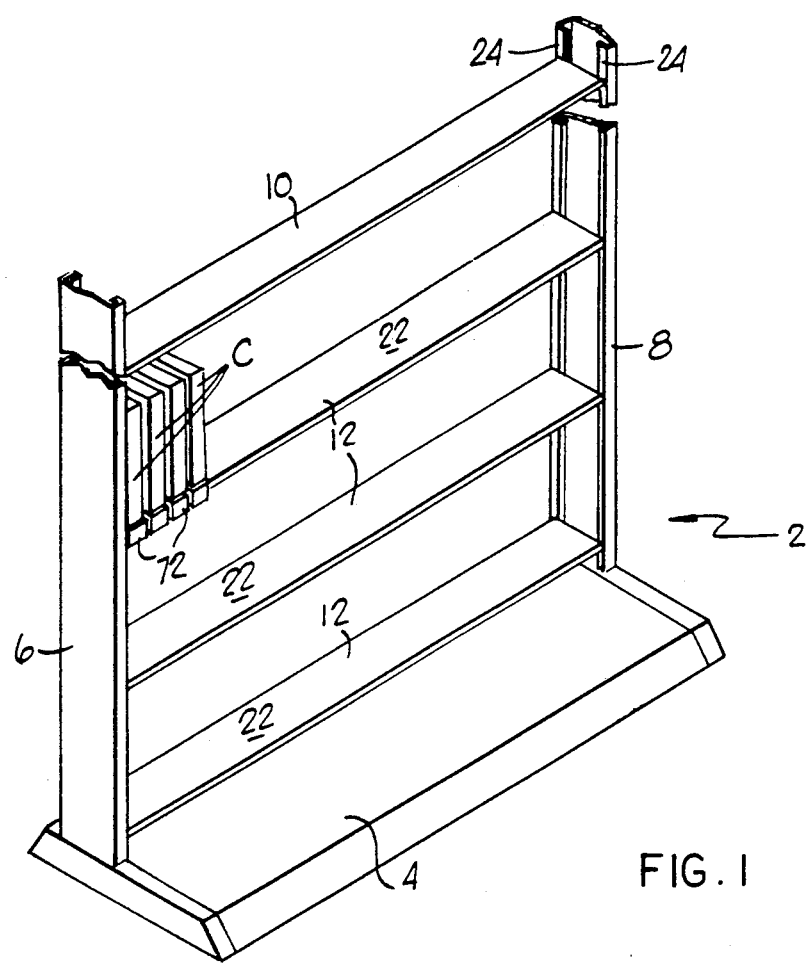
FIG. 1 is a perspective view of a storage rack.

In FIG. 1, there is illustrated a storage rack 2 comprising a base 4, a pair of sidewalls 6 and 8 and a top wall 10, each of which is generally U-shaped in cross-section. The base 4, the sidewalls 6 and 8 and the top wall 10 are formed from sheet steel and are secured together by suitable means, such as by welding. A plurality of elongated shelves 12 extend between the sidewalls 6 and 8 and are secured thereto by suitable means such as by welding. Each elongated shelf 12 is formed from sheet steel and is U-shaped in cross-section (FIG. 3) to provide a front depending flange portion 14 and a rear depending flange portion 16, each of which has a folded portion 18 for strength and which provides an exposed end portion 20. Each elongated shelf 12 has a support surface 22 lying in a generally horizontal plane. The elongated shelves 12 are dimensioned so that they can be secured to flanges 24 on the sidewalls 6 and 8. It is understood that the storage rack 2 is for illustration purposes and that an elongated shelf 12 can be mounted at various locations such as in the frame of a mobile transfer truck.

Figure 2:
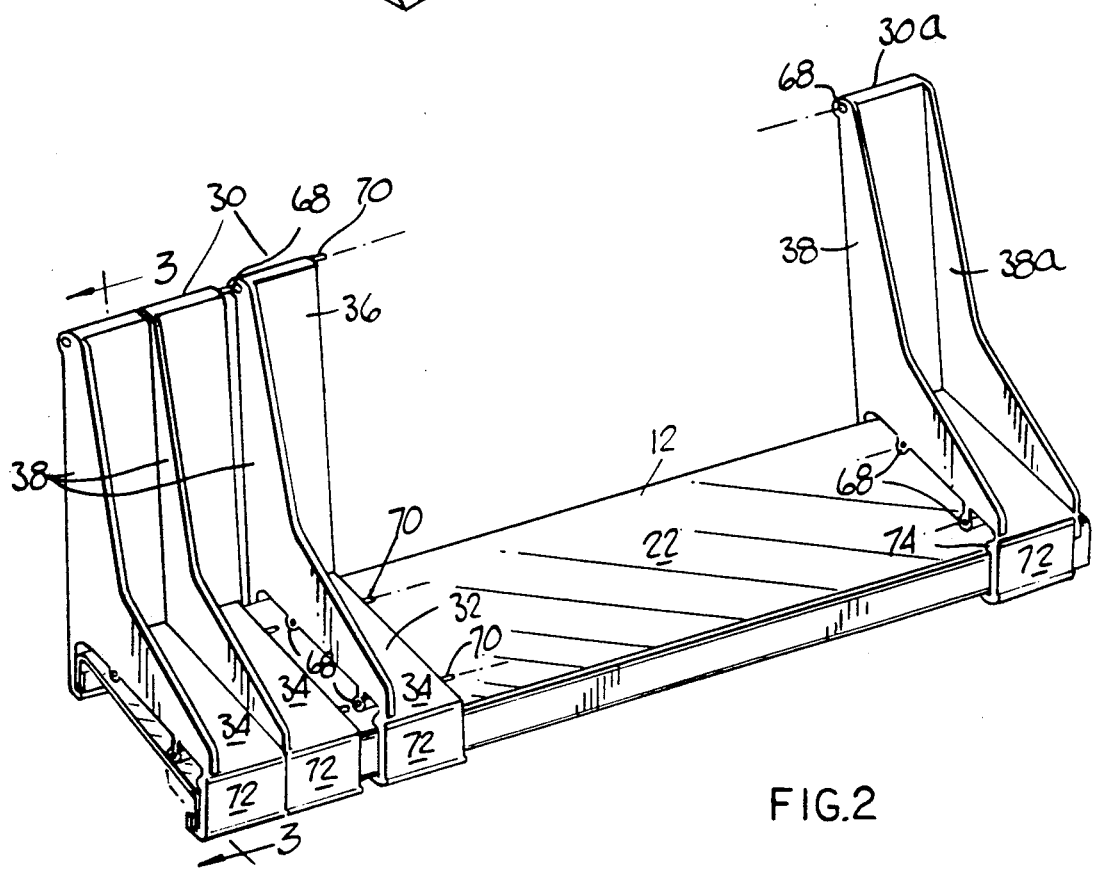
FIG. 2 is a perspective view of an elongated shelf having a plurality of compartment forming members mounted thereon.
Figure 3:
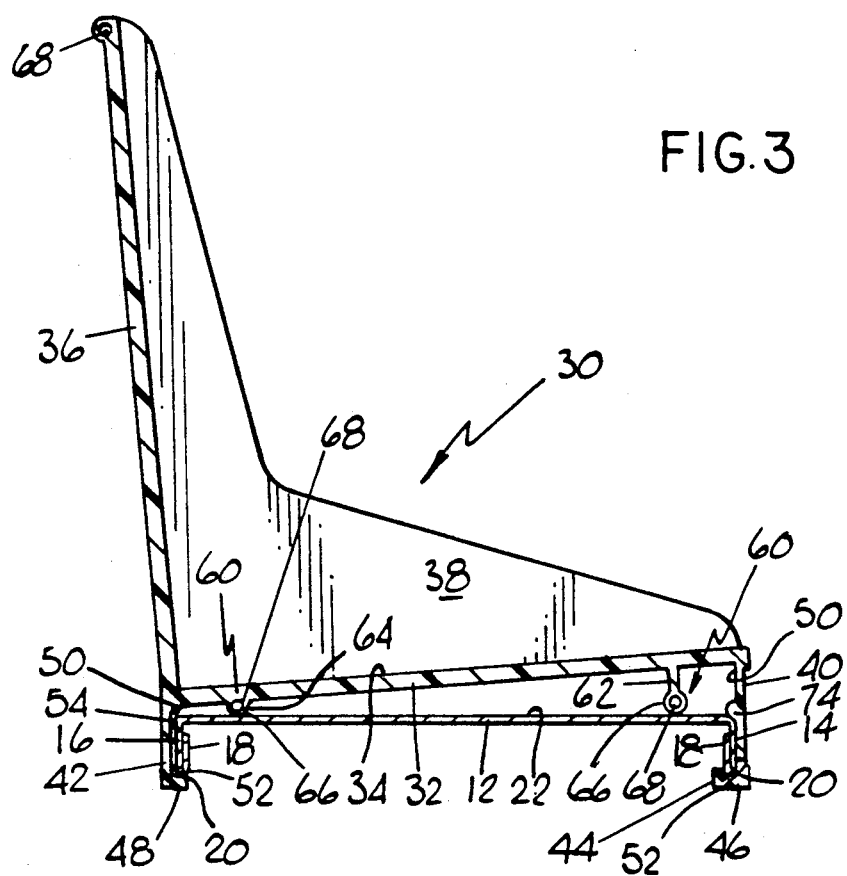
FIG. 3 is a cross-sectional view taken on the line 3—3 of FIG. 2.

A compartment forming member 30 is illustrated in FIGS. 2 and 3. Each compartment forming member 30 is integrally molded using a relatively rigid plastic material, such as high impact polystyrene, and has a base portion 32 having a supporting surface 34. An integral rear wall 36 extends upwardly from the base portion 32 and a sidewall 38, integral with the base portion 32 and the rear wall 36, extends upwardly from the base portion 32. A front flange 40 and a rear flange 42 are integral with and depend from the base portion 32. The front flange 40 has a projecting ledge 44 extending in a direction toward the rear flange 42 which projecting ledge 44 has a recess 46 formed therein so that the exposed end portion 20 of the front flange portion 14 may be located in the recess 46. The rear flange 42 has a projection 48 extending toward the front flange 40 and is in a superposed relationship with the exposed end portion 20 of the rear flange portion 16. The front and rear flanges 40 and 42 have inner surfaces 50 and the front and rear flange portions 14 and 16 have outer surfaces 52. The distance between the inner surfaces 50 is slightly more than the distance between the outer surfaces 52 so that there is at least a space 54 between the rear flange portion 16 and the rear flange 42 when the compartment forming member 30 is assembled onto an elongated shelf 12.

Integral support means 60 depend from the base portion 32 and are in contact with the support surface 22. The integral support means 60 comprise a pair of spaced apart support members 62 and 64 with the support member 62 extending downwardly from the base portion 32 for a distance greater than the distance the support member 64 extends downwardly from the base portion 32. The support members 62 and 64 have end portions 66 in contact with the support surface 22. The front flange 40 has a greater extent between the base portion 32 and the projecting ledge 44 than the extent of the rear flange 42 between the base portion 32 and the projection 48 to cooperate with the support member 62 and 64 to hold the supporting surface 34 inclined relative to the horizontal support surface 22 at an angle between about 3 and 7 degrees and preferably about 4.5 degrees so that a tape cartridge C, FIG. 1, placed on the supporting surface 34 will have a tendency to move toward and contact the rear wall 36. With the exception of the support members 62 and 64, the base portion 32 is spaced from the support surface 22 when a compartment forming member 30 is mounted on an elongated shelf 12. The distance between the body portion 32 and the recess 46 is less than the distance between the body portion 32 and the exposed end portion 20 of the front depending flange portion 14 so that, in the assembled relationship illustrated in FIG. 3, the portion of the body portion 32 next adjacent to the front flange 40 is flexed to hold the projecting ledge 44 in resilient contact with adjacent exposed end portion 20. Also, the distance between the body portion 32 and the projection 48 is less than the distance between the body portion 32 and the exposed end portion 20 of the rear depending flange portion 16 so that, in the assembled relationship, the portion of the body portion 32 next adjacent to the rear flange 42 is flexed to hold the projection 48 in resilient contact with the adjacent end portion 20. Each compartment forming member 30 is provided with recesses 68 on one side thereof and projections 70 on the other side thereof which extend in directions parallel to the longitudinal axis of an elongated shelf 12 on which they are mounted. When a plurality of compartment forming members are mounted on an elongated shelf 12, they may be moved over the elongated shelf 12 to be in a side-by-side relationship with the projections 70 fitting into the recesses 68. The recesses 68 and the projections 70 are dimensioned so that there is a friction fit therebetween. A recess 72 is formed in the front flange 40 so that an indicia bearing label may be placed thereon. Also, a reinforcing rib 74 is formed on the inner surface 50.

In FIG. 2, there is illustrated a modified compartment forming member 30a having an additional sidewall 38a. The modified compartment forming member 30a is used as the last compartment forming member when a plurality of compartment forming members 30 are mounted on an elongated shelf 12 so that there would be two sidewalls for each tape cartridge in the compartment forming members. Therefore, if only four tape cartridges were to be stored on the elongated shelf 12 of FIG. 2, three compartment forming members 30 would be mounted in a side-by-side relationship and the modified compartment forming member would be moved over the elongated shelf 12 until the projections 70 of the last compartment forming member 30 entered the recesses 68 of the modified compartment forming members 30a. The sidewall 38 of the first compartment forming member 30 on an elongated shelf 12 is next to the sidewall 6 so that a tape cartridge therein will be spaced from the sidewall 6.

When mounting a compartment forming member 30 on an elongated shelf 12, the back wall 36 is grasped by the fingers and the recess 36 is placed over the exposed end portion 20 of the front flange portion 14 which serves as a pivot for the compartment forming member 30. The compartment forming member 30 is then pivoted until the support member 62 and 64 contact the support surface 22. Pressure is continued to be applied to the back wall 36 so that the portion of the base portion 32 between the support member 64 and the rear flange 42 flexes to permit the projection 48 to pass beneath the exposed end portion 20 of the rear flange portion 16. The back wall 36 is then released and the resilient characteristics of the base portion 32 due to it being spaced from the support surface 32 at the flanges 40 and 42 moves the projection 48 into resilient contact with its adjacent exposed end portion 20 and the projecting ledge 46 into resilient contact with its adjacent end portion 20. The compartment forming member 30 is then moved over the elongated shelf 12 until the sidewall 38 contacts the sidewall 6. The foregoing mounting process is repeated until the desired number of compartment forming members 30 are mounted on the elongated shelf 12. As stated above, a modified compartment member 30a is the last one to be mounted on elongated shelf 12. A tape cartridge C may be placed on the supporting surface 34 of each compartment forming member 30. An indicia bearing label may be attached to each recess 72.

It is contemplated that the inventive concepts herein described may be variously otherwise embodied and it is intended that the appended claims be construed to include the alternative embodiments of the invention except insofar as limited by the prior art.

What is claimed is:

1. Apparatus for forming a compartment for holding an article comprising:

at least one elongated shelf having a longitudinal axis;
said elongated shelf having a support surface and a pair of longitudinally extending integral flange portions depending from opposite sides of said support surface;

said support surface having a length and a width;

support means for supporting said elongated shelf at a relatively fixed location;

at least one compartment forming member;

said compartment forming member having a base portion having a width greater than said width of said support surface;

a pair of integral flanges depending from opposite sides of said base portion;

mounting means for mounting said compartment forming member on said elongated shelf; and integral support means depending from said base portion and located between said pair of flanges for contacting said support surface to support said compartment forming member on said elongated shelf with at least a portion of said base portion spaced from said support surface and with said flange portions and said flanges in a juxtaposed relationship.

2. Apparatus as in claim 1 and further comprising:

at least one integral rear wall portion extending upwardly from one said of said base portion; and at least one integral sidewall portion extending upwardly from said base portion and forwardly from said rear wall.

3. Apparatus as in claim 2 and further comprising:

at least two of said compartment forming members mounted in side-by-side relationship on said elongated shelf to form an open sided compartment comprising said base portion, said rear wall portion, and said sidewall portion of one of said at least two compartment forming members and said sidewall portion of the other of said at least two compartment forming members.

4. Apparatus for forming a compartment for holding an article comprising:

at least one elongated shelf having a longitudinal axis;

said elongated shelf having a support surface and a pair of longitudinally extending integral flange portions depending from opposite sides of said support surface;

said support surface having a length and a width;

support means for supporting said elongated shelf at a relatively fixed location;

at least one compartment forming member;

said compartment forming member having a base portion having a width greater than said width of said support surface;

a pair of integral flanges depending from opposite sides of said base portion;

mounting means for mounting said compartment forming member on said elongated shelf;

integral support means depending from said base portion and located between said pair of flanges for contacting said support surface to support said compartment forming member on said elongated shelf with said flange portions and said flanges in a juxtaposed relationship;

said integral support means comprising:

at least a pair of spaced apart support members; and each of said support members having an end portion in contact with said support surface.

5. Apparatus as in claim 4 wherein:

said end portion of one of said support members being located a distance form said base portion that is greater than the distance the other of said support members is located from said base portion so that said base portion is inclined relative to and spaced from said support surface.

6. Apparatus as in claim 5 and further comprising:

said front and rear flange portions each having an exposed end portion; and said front flange having a projecting ledge extending toward said rear flange.

7. The invention as in claim 6 wherein:

said projecting ledge is in resilient engagement with said exposed end portion of said front flange portion;

said projecting ledge having a recess formed therein with said exposed end portion of said front flange portion being located in said recess; and said rear flange having a projection extending toward said front flange and being in resilient engagement with said exposed end portion of said rear flange portion.

8. Apparatus as in claim 7 and further comprising:

each of said front and rear flanges having an inner surface;

each of said front and rear flange portions having an outer surface; and the distance between said inner surfaces being greater than the distance between said outer surfaces for providing a space between at least one of said flanges and said flange portions.

9. Apparatus as in claim 5 wherein said at least one compartment forming member comprises:

a plurality of compartment forming members.

10. Apparatus as in claim 9 and further comprising:

each of said compartment forming members, when said compartment forming members are mounted on said elongated shelf, having a first side portion and a second side portion;

each of said compartment forming members having at least one opening extending inwardly from said first side portion; and each of said compartment forming members having at least one projection extending outwardly from said second side portion with each of said projections being dimensioned to have a frictional fit with one of said openings so that, when said plurality of compartment forming members are mounted on said elongated shelf, said projections will be within said openings.

11. Apparatus as in claim 10 and further comprising:

at least one integral rear wall portion extending upwardly from one said of said base portion; and at least one integral sidewall portion extending upwardly from said base portion and forwardly from said rear wall.

12. Apparatus as in claim 11 and further comprising:

at least two of said compartment forming members mounted in side-by-side relationship on said elongated shelf to form an open sided compartment comprising said base portion, said rear wall portion, and said sidewall portion of one of said two compartment forming members and said sidewall portion of the other of said two compartment forming members.

13. Apparatus as in claim 1 wherein said integral support means comprise:

at least one support member having an end portion in contact with said support surface; and said at least one support member being located closer to one of said pair of integral flange portions so that said base portion is inclined relative to said support surface.

14. Apparatus as in claim 1 and further comprising:
said pair of integral flange portions comprising a front flange portion and a rear flange portions;
said pair of integral flanges comprising a front flange and a rear flange;
at least a portion of said front flange being in contact with at least a portion of said front flange portion and at least a portion of said rear flange being in contact with at least a portion of said rear flange; and
resilient means for urging said portions into said contacting relationship.

15. Apparatus as in claim 14 and further comprising:
said front and rear flange portions each having an exposed end portion;
said front flange having a projecting ledge extending toward said rear flange;
said projecting ledge having a recess formed therein with said exposed end portion of said front flange portion being located in said recess; and
said rear flange having a projection extending toward said front flange and being in resilient contact with said exposed end portion of said rear flange portion.

16. Apparatus as in claim 15 wherein said resilient means comprises:
said flange portions and said flanges being dimensioned so that, when said exposed end portions are in contact with said recess and said projection, the portions of said body portion next adjacent to said flanges are each flexed to hold said recess and said projection in said resilient contact.

17. Apparatus as in claim 16 and further comprising:
at least one integral rear wall portion extending upwardly from one said of said base portion; and
at least one integral sidewall portion extending upwardly from said base portion and forwardly from said rear wall.

18. Apparatus as in claim 17 and further comprising:
at least two of said compartment forming member mounted in side-by-side relationship on said elongated shelf to form an open sided compartment comprising said base portion, said rear wall portion, and said sidewall portion of one of said two compartment forming members and said sidewall portion of the other of said two compartment forming members.

19. Apparatus as in claim 18 and further comprising:
a reinforcing rib on said inner surface of said front flange.

20. Apparatus as in claim 18 and further comprising:
said front flange having a front surface; and
said front surface having a recess formed thereon so that an indicia containing label may be mounted in said recess.

* * * * *